(12) United States Patent
Tournatory

(10) Patent No.: US 9,397,559 B2
(45) Date of Patent: Jul. 19, 2016

(54) SWITCHING REGULATOR CURRENT MODE FEEDBACK CIRCUITS AND METHODS

(71) Applicant: GAZELLE SEMICONDUCTOR, INC., Redwood City, CA (US)

(72) Inventor: David Christian Gerard Tournatory, Redwood City, CA (US)

(73) Assignee: Gazelle Semiconductor, Inc., Sunnyvale, CA (US)

( * ) Notice: Subject to any disclaimer, the term of this patent is extended or adjusted under 35 U.S.C. 154(b) by 88 days.

(21) Appl. No.: 14/315,672

(22) Filed: Jun. 26, 2014

(65) Prior Publication Data

US 2015/0145495 A1    May 28, 2015

Related U.S. Application Data

(60) Provisional application No. 61/908,636, filed on Nov. 25, 2013.

(51) Int. Cl.
*H02M 3/156* (2006.01)
*H02M 3/158* (2006.01)
*H02M 1/00* (2006.01)

(52) U.S. Cl.
CPC ............. *H02M 3/156* (2013.01); *H02M 3/158* (2013.01); *H02M 3/1588* (2013.01); *H02M 2001/0009* (2013.01)

(58) Field of Classification Search
CPC ... H02M 3/156; H02M 3/158; H02M 3/1588; H02M 2001/0009
See application file for complete search history.

(56) References Cited

U.S. PATENT DOCUMENTS

| | | | | |
|---|---|---|---|---|
| 4,825,383 | A * | 4/1989 | Ory | G01F 23/246 702/53 |
| 6,583,610 | B2 * | 6/2003 | Groom | H02M 3/156 323/224 |
| 6,930,474 | B2 * | 8/2005 | Wang | H02M 3/1588 323/224 |
| 7,119,522 | B1 * | 10/2006 | Tomiyoshi | H02M 3/1588 323/224 |
| 7,170,267 | B1 | 1/2007 | McJimsey | |
| 7,764,054 | B1 * | 7/2010 | Guo | H02M 3/156 323/224 |
| 7,936,160 | B1 * | 5/2011 | Sheehan | H02M 3/156 323/222 |
| 2006/0044843 | A1 | 3/2006 | Oswald et al. | |
| 2009/0146634 | A1 | 6/2009 | Andy | |
| 2010/0079127 | A1 | 4/2010 | Grant | |
| 2010/0259239 | A1 * | 10/2010 | Shi | H02M 1/08 323/282 |
| 2012/0025799 | A1 * | 2/2012 | Tournatory | H02M 3/156 323/285 |
| 2013/0207627 | A1 | 8/2013 | Kahn et al. | |

OTHER PUBLICATIONS

International Search Report and Written Opinion—PCT/US2014/65926—ISA/US—Feb. 11, 2015.

* cited by examiner

*Primary Examiner* — Jue Zhang
*Assistant Examiner* — Lakaisha Jackson

(57) ABSTRACT

The present disclosure includes circuits and methods for controlling the operation of a switching regulator. In one embodiment, the present disclosure includes a circuit comprising a switching regulator with a current control loop comprising a capacitor configured to store a first voltage during a first phase and configured to boost a voltage produced by an output current through a low side switching device by the first voltage in a second phase. Circuitry compares the boosted voltage to a control voltage produced by a control current through a replica device corresponding to the low side switching device.

16 Claims, 5 Drawing Sheets

SWITCHING REGULATOR CURRENT MODE FEEDBACK CIRCUITS AND METHODS

CROSS-REFERENCE TO RELATED APPLICATIONS

This application claims priority to U.S. Provisional Patent Application Ser. No. 61/908,636, filed Nov. 25, 2013 the contents of which are hereby incorporated by reference herein in its entirety.

BACKGROUND

The present disclosure relates to electronic systems and methods, and in particular, to circuits and methods for current mode feedback in a switching regulator.

Switching regulators are often used to provide varying currents to loads while maintaining constant voltage. It is often desirable to control the output current of a switching regulator to maintain the output voltage. Precisely controlling current can be very difficult as voltages in the regulator take on a range of values as a result of switching.

SUMMARY

The present disclosure includes circuits and methods for current mode feedback in a switching regulator. In one embodiment, voltage on a switching device in a switching regulator is sensed during a phase when the device is on and conducting current. The voltage may be outside an operating range of the circuit, such as below a low reference voltage (e.g., ground) or above a high reference voltage (e.g., Vin). The voltage is level shifted (e.g., boosted) within the range and compared to another voltage generated by a control current. The control current is based on a difference between a reference voltage and a feedback voltage.

The following detailed description and accompanying drawings provide a better understanding of the nature and advantages of the present disclosure.

DETAILED DESCRIPTION

The present disclosure pertains to current sensing and control in switching regulators. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
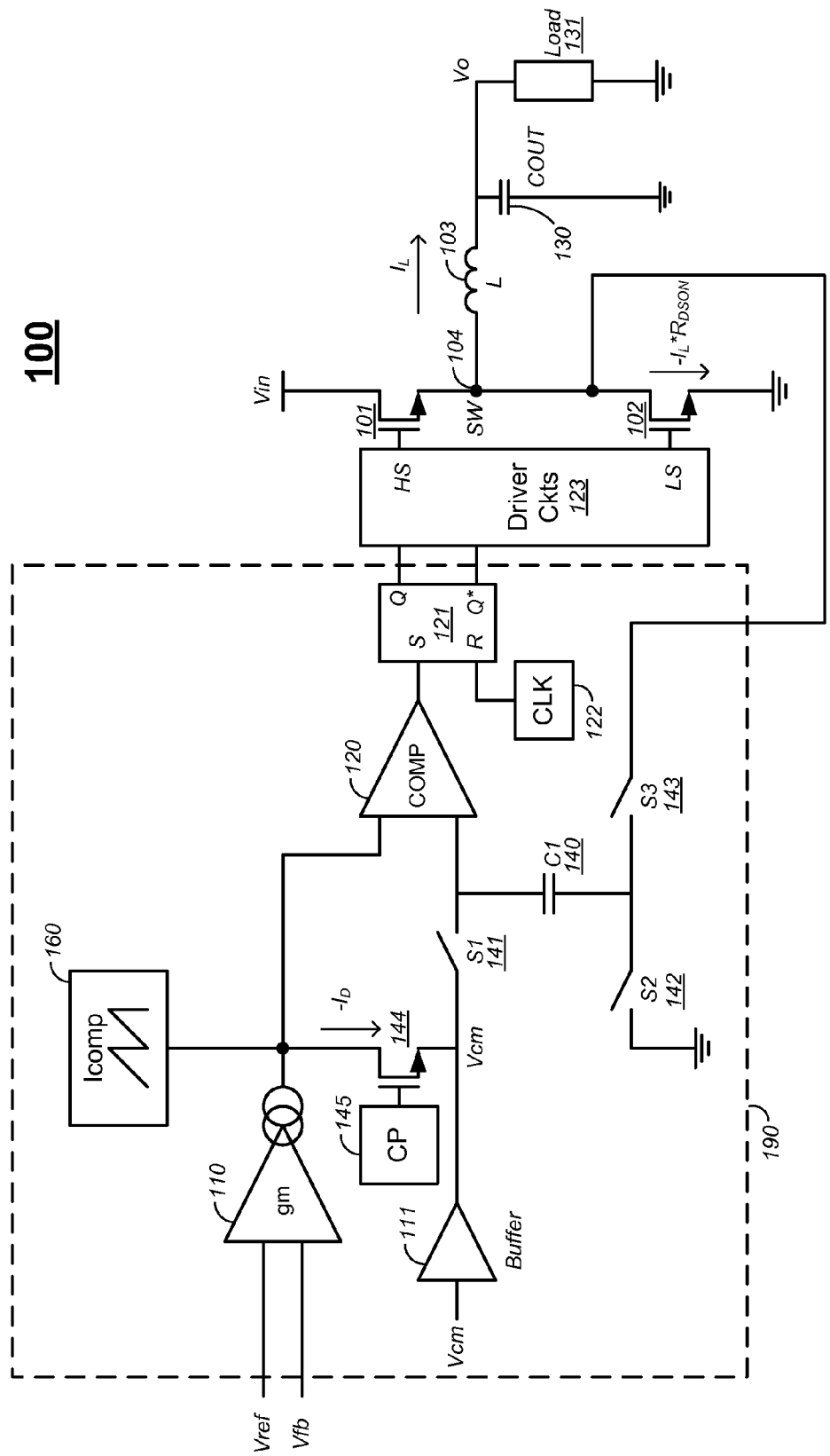
FIG. 1 illustrates current control in a switching regulator according to one embodiment.

Embodiments of the present disclosure include circuits and methods for operating a switching regulator. FIG. 1 illustrates current control in a switching regulator 100 according to one embodiment. The circuit in FIG. 1 is a simplified diagram of a switching regulator with current mode feedback for controlling output current. For example, a switching regulator may produce an output current into a load at an approximately constant output voltage Vo. The output current is generated by selectively turning a high side switch 101 and a low side switch 102 on and off to produce a current IL in inductor 103. Switches 101 and 102 may be implemented as transistors, such as Field Effect Transistors (FETs), for example. Inductor current IL is provided to an output capacitor 130 and load 131 to produce an output voltage Vo. Output voltage Vo is maintained approximately constant using feedback implemented by a control circuit 190. For instance, output voltage Vo may be sensed and fed back to a transconductance amplifier 110 (gm) for comparison in control circuit 190. Transconductance amplifier 110 receives a feedback voltage Vfb (e.g., Vo) and a reference voltage Vref. For example, if Vo decreases (due to an increase in load current demand), the inductor current should be increased, and if Vo increases (due to a decrease in load current demand), the inductor current should be decreased. Embodiments of the present disclosure provide a mechanism for determining if the output current of a switching regulator should be changed, sensing the output current, and controlling switches in the switching regulator so that the output current meets a control current representing a desired output current.

More specifically, if the load 131 current of the switching regulator 100 increases, the output voltage Vo may start to drop. Transconductance amplifier 110 produces control current Id based on a difference between reference voltage Vref and feedback voltage Vfb. In one embodiment, Vfb is coupled to Vo (e.g., through a resistor divider). Transconductance amplifier 110 may include an integrator, for example. Thus, a drop in Vo relative to Vref causes an increase in the control current Id of transconductance amplifier 110. The control current Id of the gm stage is also referred to as the "desired" current. In this example, Id corresponds to the output current that is desired to drive the load. Id is referred to as a control current because Id is compared against a measured output current and used to control the output current as described below. For instance, if output current IL is too low, high side FET 101 may be turned on (e.g., for a longer period of time each cycle) to increase IL. Alternatively, if output current IL is too high, low side FET 102 may be turned on (e.g., for a longer period of time each cycle) to decrease IL.

In this example, if Vo drops, current Id is increases. Id may be compared against the inductor current IL and used to cause the inductor current to increase to maintain the desired output voltage. Features and advantages of the present disclosure include sensing output current IL through the low side FET 102. For instance, when low side FET 102 is turned on and high side FET 101 is turned off, inductor current IL flows from ground through FET 102. Therefore, a voltage corresponding to the inductor current may be sensed by detecting a voltage drop across FET 102 caused by an ON resistance of the FET (Rdson) when the FET is turned on. The voltage drop across the low side FET 102 caused by the inductor current is given by: V=−IL*Rdson. However, inductor current IL may be positive or negative. When the inductor current is positive (e.g., current flowing from ground, through FET 102, through inductor L 103 and into the load) the voltage on node SW becomes negative (lower than ground) due to the voltage drop across FET 102. Sensing inductor current that results in voltages below ground is problematic for the other parts of the circuit. Accordingly, it is very difficult to measure inductor current IL through low side switching devices for both positive and negative current.

Features and advantages of the present disclosure include a regulation loop around a switching output stage including a current mode circuit that can sense positive and negative voltages even when the current causes the voltages to exceed the operational range of the switching regulator—e.g., when the voltages fall below the lowest circuit reference voltage (e.g., ground) or increase above the highest circuit reference voltage (e.g., Vin). In one embodiment, a level shift capacitor 140 is used to shift (or boost) a negative voltage across a low side FET above ground for processing. FIG. 1 illustrates one example embodiment using a level shift (or boost) capacitor C1. In a first phase of operation, when the high side FET 101 is turned on and low side FET 102 is off, switches S1 141 and S2 142 are closed and switch S3 143 is open. In this state, a common mode voltage, Vcm, between ground and Vin is stored across capacitor C1 140. In a second phase of operation, when low side FET 102 is turned on and high side FET 102 is off, switch S3 is closed and switches S1 and S2 are opened. Accordingly, in this example, a negative voltage across low side FET 102 (e.g., −IL*Rdson) produced by a positive inductor current is level shifted (or voltage boosted) by the common mode voltage. In other words, the common mode voltage on a terminal of C1 coupled to an input of a loop comparator 120 is shifted down by negative voltage −IL*Rdson when switch S3 is closed, but for this example, as long as the absolute IL*Rdson voltage is less than the common mode voltage Vcm, the voltage at the input of the comparator remains positive. For example, so long as the following condition holds, the voltage at the input of comparator 120 remains positive: abs|IL|*Rdson<Vcm. More generally, the boosted voltage (e.g., a sum of the voltage drop across the low side FET and Vcm) may be less than a positive supply voltage for a maximum negative inductor current and greater than ground for a maximum positive inductor current. Additionally, the boosted voltage may be within an operating range of comparator 120. As described further below, the level shifted (boosted) voltage across the low side FET may be compared against a control current through a replica load offset by the same common mode voltage to control the inductor current. This allows keeping voltages on both inputs of the comparator in between the circuit rails regardless of the value of the output current flowing through the transistor 102.

Figure 2:
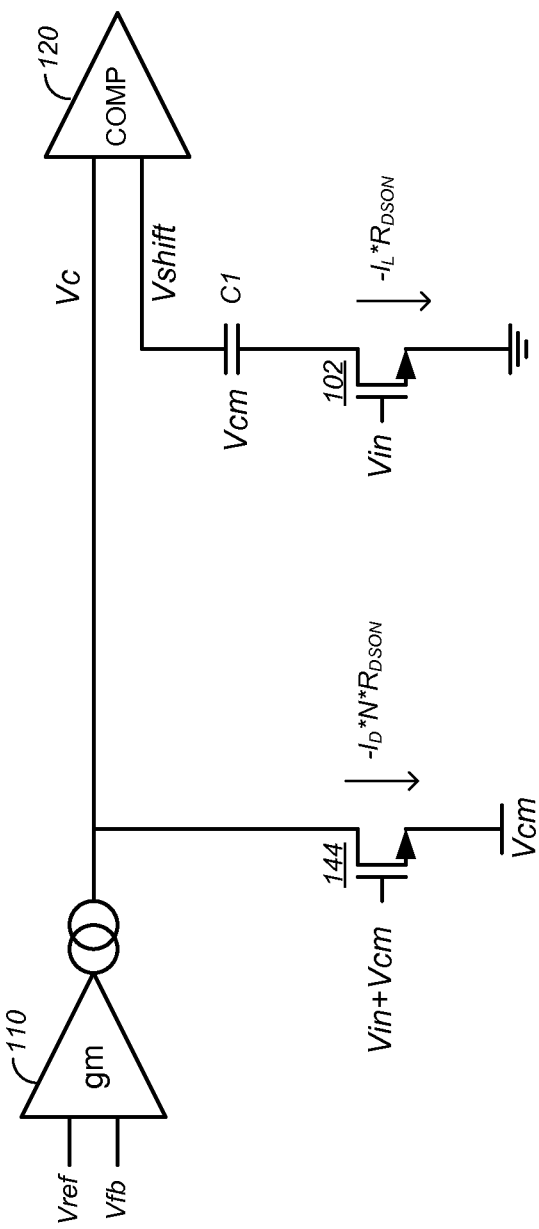
FIG. 2 shows a simplified diagram illustrating voltage shifted comparison of a control current and a load current according to one embodiment.

FIG. 2 illustrates a simplified circuit illustrating level shifting according to one embodiment. In this simplified example, a control current from a transconductance gm stage 110 is coupled to a replica FET 144 corresponding to low side FET 102. The replica device 144 may be a FET, for example, of the same type (e.g., N-type or P-type) than the switching FET 102 with the same orientation and sometimes laid out in common centroid with the switching FET 102 but with a much smaller size. Because the replica FET is much smaller than the switching FET, the Rdson of the replica FET is much higher and the same voltage drop can be generated across the replica FET than the switching FET by providing only a small faction of the inductor current through the gm stage. Due to the action of level shift capacitor C1, the voltage at the first input of the comparator 120 is −IL*Rdson+Vcm. Accordingly, a capacitor provides a mechanism for boosting a sensed voltage corresponding to a current through the low side switching transistor by a voltage to produce a boosted voltage, Vboost, at the input of comparator 120. Similarly, the voltage at the other input of the comparator 120 is −Id*N*Rdson+Vcm, where N is a scale factor corresponding to a difference in device sizes between low side FET 102 and replica FET 144. As shown in FIG. 2, transconductance stage and replica transistor 144 provide a mechanism for generating a control voltage, Vc, at the input of comparator 120 based on a control current, ID, through a replica transistor 144, where the control current corresponds to a difference between a feedback voltage, Vfb, and a reference voltage, Vref. Comparator 120 provides a mechanism for comparing the control voltage and boosted voltage, for example. In some example implementations FET 144 may be significantly smaller than FET 102 such that the ON resistance of replica FET 144 is 100 k larger (N=100 k) than the Rdson of low side FET 102, for example. The control current may therefore be correspondingly smaller than the current IL through the inductor as shown below. As illustrated in FIG. 2, when turned on, low side FET 102 has a gate voltage of Vin and a source voltage of ground. Therefore, the source of replica FET 144 may be coupled to the common mode voltage Vcm and the gate may receive a voltage Vin+Vcm. The replica FET 144 is therefore offset by the same voltage used to boost the voltage across FET 102. Feedback action of the loop drives the output current IL so that the following is satisfied:

(Id*N*Rdson+Vcm)=IL*Rdson+Vcm; where Id=gm (Vref−Vout), which reduces to:

Id*N=IL.

Thus, Id may be used to control output current IL.

In one embodiment, a replica (e.g., a copy via a current mirror) of the Idesired may be coupled to a resistor to ground, for example, to detect the output current of the switching regulator. Such a scenario may be advantageous for inductor current monitoring. In one embodiment, a replica of Idesired may be coupled to a package pin so that a user can connect a resistor to ground and sense the output current externally, for example. Another technique for sensing output current using an ADC is described below.

Referring again to the example circuit in FIG. 1, an output of gm circuit 110 is coupled to an input of a comparator 120 and a terminal of a replica transistor 144. A charge pump (CP) 145 generates a gate voltage of Vin+Vcm. A buffer circuit 111 receives a common mode voltage Vcm and maintains Vcm at the source terminal of NMOS replica transistor 144 and, when switch S1 and S2 are closed, sets Vcm across capacitor C1. When S1 and S2 open, S3 closes, and FET 102 is turned on, voltage drop −IL*Rdson is level shifted to the other input of comparator 120. In this example, control current Id also receives a ramp signal from current compensation circuit 160 for loop stability, for example. Therefore, Id adjusts the ramp offset and sets the point in each cycle where the comparator 120 triggers. An output of the comparator is coupled to a set input (S) of a set-reset (SR) flip flop (FF) 121. A clock circuit 122 resets the flip flop on each clock cycle. The Q output of the SRFF is coupled to the gate of high side FET 101 through a driver circuit 123 and the inverse of Q (Q*) is coupled to the gate of the low side FET 102 also through driver circuit 123.

Accordingly, Id is compared to the sensed current IL in the low side FET. The comparator turns HS and LS on/off based on a comparison of IL and Id so that IL increases or decreases according to control current Id, which in turn corresponds to Vo. In particular, comparator compares Id to IL and turns on HS if IL is too low or keeps on LS if IL is too high. CLK may turn the HS off every cycle. Thus, if IL is too low, Id (scaled) may be less than IL, and the comparison increases the HS on time in the cycle and decreases the LS on time during the cycle to increase IL. Similarly, if IL is too high, Id (scaled) may be less than IL, and the comparison decreases the HS on time in the cycle and increases the LS on time during the cycle to reduce IL. As mentioned above, a ramp (or other triangular) waveform from current compensation circuit 160 is added on top of Id for stabilizing the loop. The ramp waveform produces a pulse width modulated (PWM) signal on the HS and LS gate control signals. Thus, the voltage created by Id into the replica device 144 may shift the ramp level so that the duty cycle of the PWM signal changes to adjust the inductor current based on the control current and sensed output current, for example.

Figure 3:
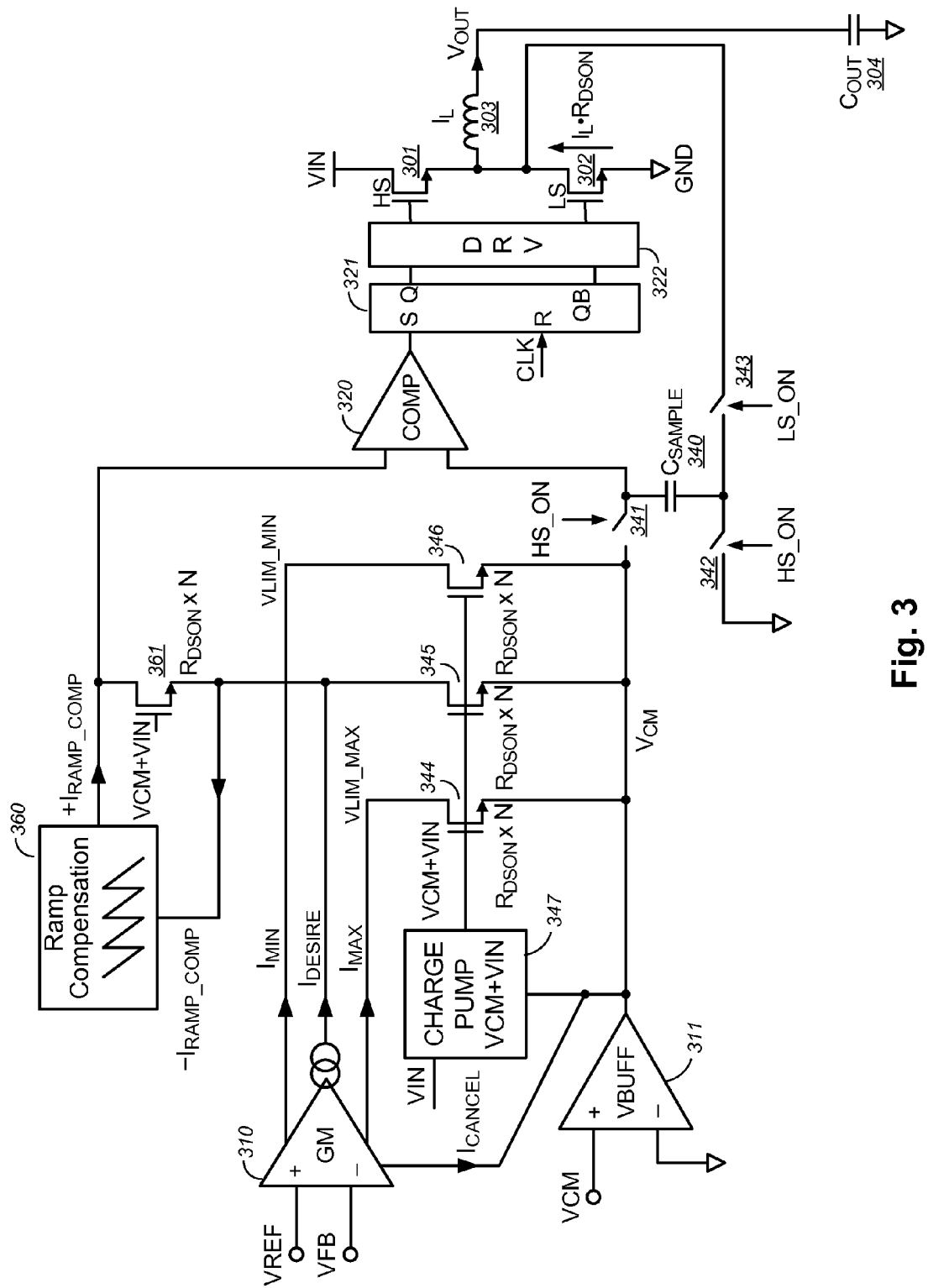
FIG. 3 illustrates another example of current control in a switching regulator according to one embodiment.

FIG. 3 illustrates another example of current control in a switching regulator according to one embodiment. In this example, a ramp generator 360 produces current signals+ Iramp_comp and −Iramp_comp across the terminals (e.g., source and drain) of another replica FET 361 having an on resistance Rdson*N. The gate of the replica FET 361 may also be biased by the charge pump at Vin+Vcm. The voltage at the reference input of the comparator is then:

Iramp_comp*Rdson*N+Id*Rdson*N+Vcm, where the ramp produces a PWM signal to control the high side and low side FET switches, for example.

Additionally, in the example shown in FIG. 3, transconductance stage gm 310 produces reference currents Imax and Imin corresponding to a maximum allowable output current and a minimum allowable output current, respectively. Imax and Imin are coupled to additional replica devices 344 and 346 to generate voltages that are used by the gm stage to set maximum and minimum current limits to clamp Idesired between the limits. For example, Imax is provided to a replica impedance FET 344 so that the resulting limit voltage, VLIM_MAX, corresponds to a maximum output inductor current (positive to the load) through the low side FET. Similarly, Imin is provided to another replica impedance FET 346 so that the resulting limit voltage, VLIM_MIN, corresponds to a minimum output inductor current (or maximum negative current into ground) through the low side FET. Control current Id may vary above Imin and below Imax so that the output also varies between corresponding maximum and minimum values. According to one example embodiment, some special circuitry inside the stage 310 may sense the Idesire node, VLIM_MAX node, and VLIM_MIN node to limit the Idesired current as follows:

$$I_{Desire}=MAX(I_{MIN},MIN(I_{MAX},GM\times(VREF-V_{OUT})))$$.

Transconductance stage 310 outputs 3 currents IMIN, Idesire, and IMAX that eventually all flow in the output node of the VBUFF. In order to make the design of the VBUFF simpler and reduce its bandwidth requirement the sum of those three currents (called ICANCEL) is generated by the GM stage 310 and sunk from the output node of the VBUFF so that the net current into the common mode node at the output of VBUFF is approximately zero. This way the VBUFF output current does not change when any of those three current change. A similar current cancellation is used for the Ramp Compensation block as shown in FIG. 3.

Figure 4:
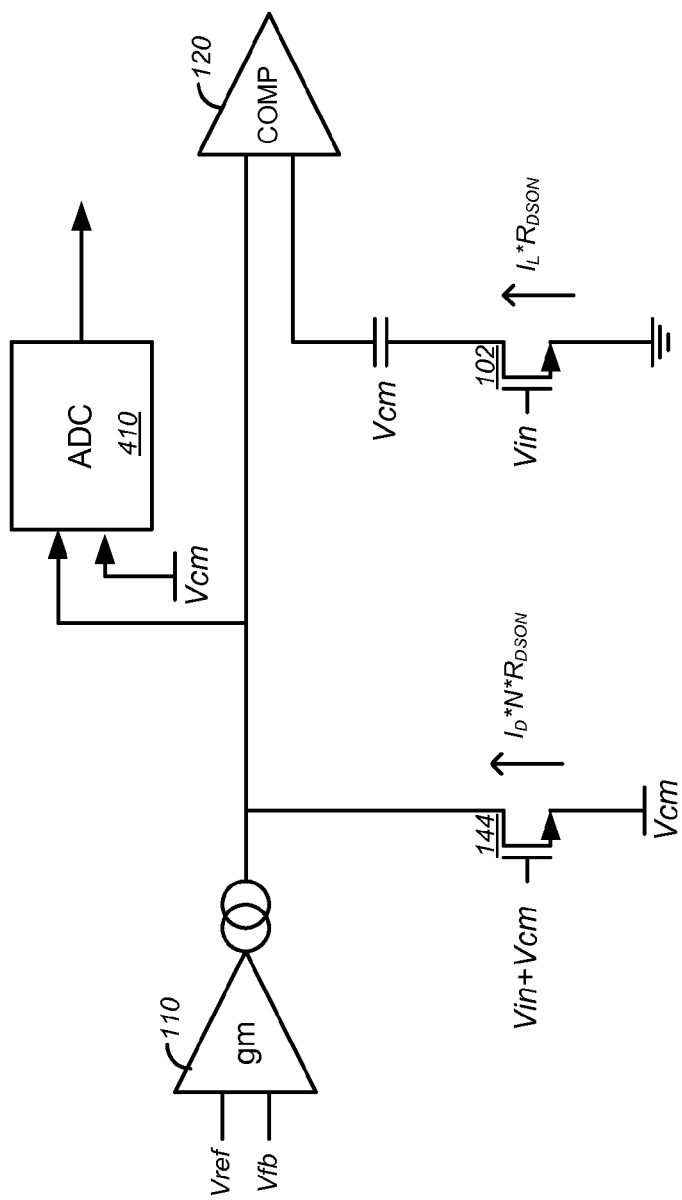
FIG. 4 illustrates another example of a switching regulator according to one embodiment.

FIG. 4 illustrates another example of a switching regulator according to one embodiment. In this example, an analog-to-digital converter 410 is coupled to the replica device. In this example, a voltage generated based on Id into the replica device is sent to an ADC. The output of the ADC can then be made available to the user through a serial interface to advantageously report the output current, for example.

Figure 5:
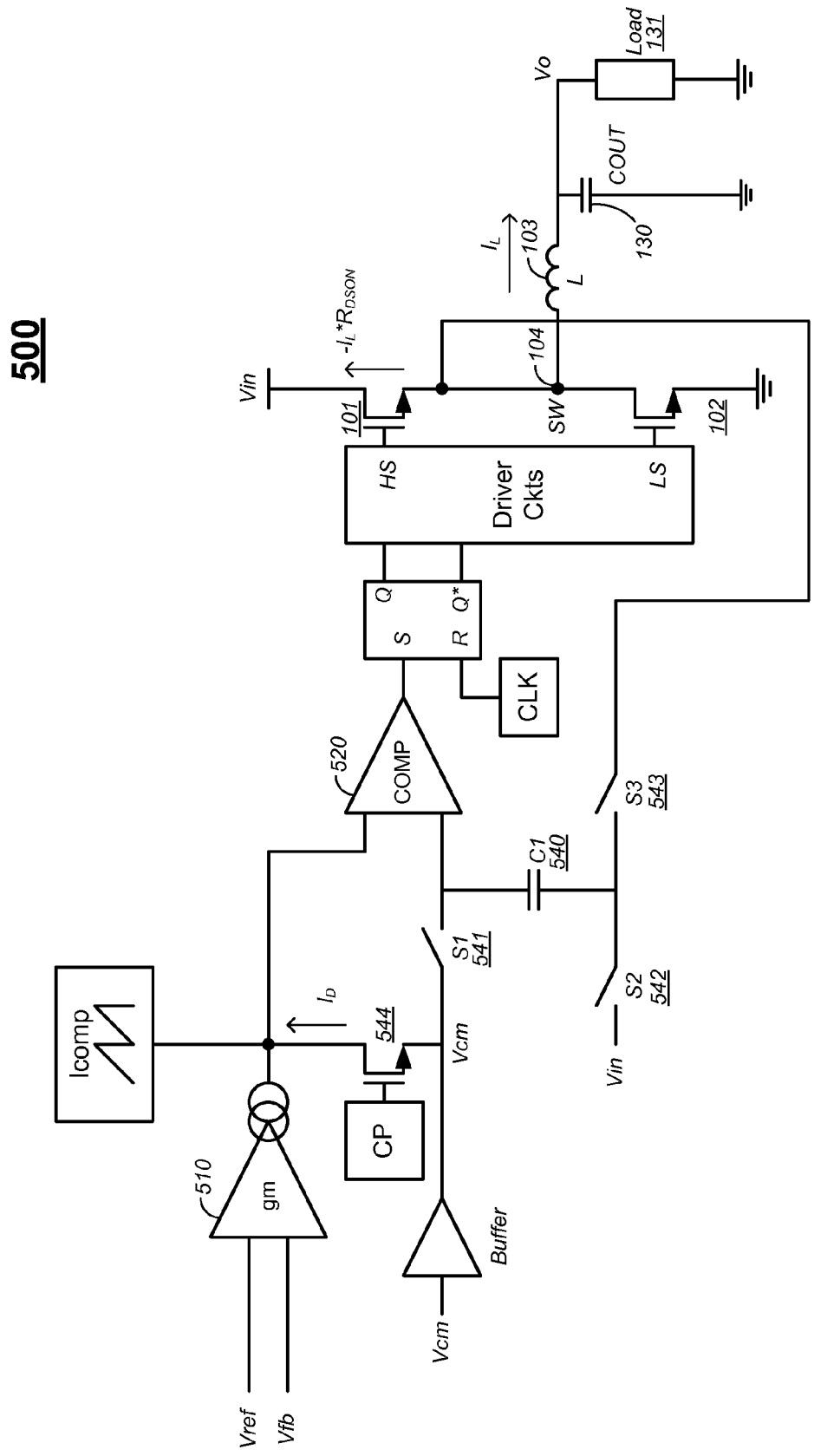
FIG. 5 illustrates another example of current control in a switching regulator according to one embodiment.

It should be noted that one person skilled in the art could easily flip this implementation to sense the current of the high side switch instead of the low side switch using the exact sensing concept. FIG. 5 illustrates current control using the high side switching transistor 101 in an output stage including low side transistor 102, and inductor 103. In this example, during a first phase, when high side transistor 101 is off and low side transistor 102 is on, switches S1 541 and S2 542 are closed and switch SW3 is open, and a voltage Vin-Vcm is stored across capacitor 540. During a second phase, when high side transistor 101 is closed and low side transistor 102 is open, S1 and S2 are open and S3 is closed. For a negative inductor current, the switching node voltage goes above the positive supply rail, Vin by an amount IL*Rdson. The voltage at the input of the comparator is therefore:

Vin−IL*Rdson−(Vin−Vcm)=Vcm−IL*Rdson

As above, the action of the loop forces the comparator inputs to be equal. In this case the following are the voltages at the comparator inputs:

Vcm−IL*Rdson=Vcm−ID*N*Rdson, or

IL=N*ID.

Further Example Embodiments

In one embodiment, the present disclosure includes a switching regulator circuit comprising a low side switching transistor and a control circuit comprising a capacitor and a replica transistor corresponding to the low side switching transistor. During a first phase, the low side switching transistor is off and the control circuit is configured to store a first voltage on the capacitor. During a second phase, the low side switching transistor is on and the control circuit is configured to boost a voltage produced by an output current through the low side switching transistor by the first voltage and compare a boosted voltage to a control voltage produced by a control current through the replica transistor.

In one embodiment, the control circuit further comprises a first switch coupled between a first terminal of the capacitor and the first voltage, a second switch coupled between a second terminal of the capacitor and a reference voltage, and a third switch coupled between the second terminal of the capacitor and a terminal of the low side switching transistor. During the first phase, the first switch and the second switch are closed and the third switch is open, and during the second phase, the third switch is closed and the first switch and the second switch are open.

In one embodiment, the reference voltage is a supply voltage.

In one embodiment, the replica transistor comprises a control terminal coupled to a charge pump, a first terminal coupled to receive the first voltage, and a second terminal coupled to a first input of a comparator, and wherein, during the second phase, the low side switching transistor comprises a control terminal coupled to a second voltage, a first terminal coupled to ground, and a second terminal coupled to a second input of the comparator through the capacitor, wherein the charge pump produces a charge pump voltage at the control terminal of the replica transistor equal to a sum of the second voltage and the first voltage.

In one embodiment, the control circuit further comprises a comparator having a first input coupled to a first terminal of the capacitor and a second input coupled to a terminal of the replica transistor.

In one embodiment, the control circuit further comprises a transconductance circuit to produce the control current.

In one embodiment, the transconductance circuit comprises a first input coupled to a reference voltage and a second input coupled to receive a feedback voltage, where the control current is based on a difference between the reference voltage and the feedback voltage.

In one embodiment, the feedback voltage is an output voltage of the switching regulator.

In one embodiment, the control circuit further comprises a second replica transistor and a third replica transistor. The transconductance circuit generates a first current corresponding to a maximum output current through the second replica transistor to produce a first limit voltage, the transconductance circuit generates a second current corresponding to a minimum output current through the third replica transistor to produce a second limit voltage, and the first limit voltage and the second limit voltage limit the output current within a particular range.

In one embodiment, the boosted voltage is less than a positive supply voltage for a maximum negative inductor current and greater than ground for a maximum positive inductor current.

In one embodiment, the switching regulator further comprises an inductor having a first terminal coupled a terminal of the low side switching transistor and a second terminal coupled to an output node of the switching regulator circuit.

In one embodiment, the switching regulator further comprises a high side switching transistor having a first terminal coupled to a supply voltage and a second terminal the first terminal of the inductor.

In one embodiment, the switching regulator further comprises an analog-to-digital converter having an input coupled to the replica transistor to determine the control current.

In another embodiment, the present disclosure includes a method comprising sensing a voltage on a low side switching transistor of a switching regulator produced by an output current through the low side switching transistor when the low side switching transistor is on, the voltage being less than a low reference voltage of the switching regulator, boosting the sensed voltage by a first voltage stored on a capacitor to produce a boosted voltage greater than the low reference voltage at a first input of a comparator, and generating a control voltage at a second input of the comparator, the control voltage generated by coupling a control current into a first terminal of a replica transistor corresponding to the low side switching transistor.

In one embodiment, the method further comprises, during a first phase, when the low side switching transistor is off, coupling the first voltage to a first terminal of the capacitor through a first switch and coupling the low reference voltage to a second terminal of the capacitor through a second switch, and during a second phase, when the low side switching transistor is on, opening the first switch and the second switch and coupling the voltage on the low side switching transistor to the second terminal of the capacitor through a third switch.

In one embodiment, the method further comprises coupling a charge pump voltage equal to a sum of a second voltage and the first voltage to a control terminal of the replica transistor and coupling the first voltage to a second terminal of the replica transistor, wherein the first terminal of the replica transistor is coupled to the second input of a comparator, and coupling the second voltage to a control terminal of the low side switching transistor during the second phase, coupling a first terminal of the low side switching transistor to ground, and coupling a second terminal of the low side switching transistor to the first input of the comparator through the capacitor.

In one embodiment, the method further comprises converting a difference between a reference voltage and the output voltage of a switching regulator stage into the control current.

In one embodiment, the method further comprises determining the control current using an analog-to-digital converter.

In another embodiment, the present disclosure includes a switching regulator circuit comprising a low side switching transistor, an inductor, means for boosting a sensed voltage corresponding to a current through the low side switching transistor by a first voltage to produce a boosted voltage, means for generating a control voltage based on a control current through a replica transistor, the control current corresponding to a difference between a feedback voltage and a reference voltage, and means for comparing the control voltage and the boosted voltage, to change a current in the inductor to reduce the difference between the feedback voltage and the reference voltage.

In one embodiment, the boosted voltage is less than a positive power supply voltage for a maximum negative inductor current and greater than ground for a maximum positive inductor current.

In one embodiment, the present disclosure includes a switching regulator with a control loop comprising a capacitor configured to store a first voltage during a first phase and configured to boost a voltage produced by an output current through a low side FET by the first voltage in a second phase and compare the boosted voltage to a control voltage produced by a control current through a replica FET corresponding to the low side FET.

In one embodiment, the replica FET has a gate coupled to a charge pump to receive a voltage equal to a reference voltage boosted by the first voltage.

In one embodiment, during output current sensing, a gate of the low side FET is coupled to an input voltage and a second terminal of the low side FET is coupled to ground, and a gate of the replica FET is coupled to the input voltage boosted by a common mode voltage and the second terminal of the replica FET is coupled to the common mode voltage (e.g., the gate and source of the replica FET are boosted because Id*Rreplica FET are boosted at an input of a comparator to match the boosting of IL*Rdson from the low side FET at the other input of the comparator.

In one embodiment, the present invention includes a method comprising sensing a voltage on a low side FET of a switching regulator produced by a current through the low side FET when the low side FET is on and when a high side FET is off, the voltage being less than a low reference voltage of the switching regulator, boosting a constant voltage stored on a capacitor by the sensed voltage to produce a boosted voltage at an input of a comparator, generating a second voltage at another input of the comparator, the second voltage generated by coupling a control current into a first terminal of a replica FET corresponding to the low side FET, wherein a gate of the low side FET is coupled to a first reference voltage, a terminal of the low side FET is coupled to the low reference voltage, a gate of the replica FET is couple to a voltage equal to the sum of the first reference voltage and the constant voltage stored on the capacitor, and a second terminal of the replica FET is equal to the constant voltage.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A switching regulator circuit, comprising:
   a low side switching transistor; and
   a control circuit comprising:
      a capacitor;
      a first switch coupled between a first terminal of the capacitor and a first voltage;
      a second switch coupled between a second terminal of the capacitor and a reference voltage;
      a third switch coupled between the second terminal of the capacitor and a terminal of the low side switching transistor; and
      a replica transistor corresponding to the low side switching transistor,
   wherein, during a first phase, the low side switching transistor is off, the first and second switches are closed and the third switch is open, and the control circuit is configured to store the first voltage on the capacitor, and
   wherein, during a second phase, the low side switching transistor is on, the third switch is closed and the first and second switches are open, and the control circuit is configured to boost a voltage produced by an output current through the low side switching transistor by the first voltage and compare a boosted voltage to a control voltage produced by a control current through the replica transistor.

2. The switching regulator circuit of claim 1, further comprising an analog-to-digital converter having an input coupled to the replica transistor to determine the control current.

3. The switching regulator circuit of claim 1, wherein the reference voltage is a supply voltage.

4. The switching regulator circuit of claim 1, wherein the replica transistor comprises a control terminal coupled to a charge pump, a first terminal coupled to receive the first voltage, and a second terminal coupled to a first input of a comparator, and wherein, during the second phase, the low side switching transistor comprises a control terminal coupled to a second voltage, a first terminal coupled to ground, and a second terminal coupled to a second input of the comparator through the capacitor, wherein the charge pump produces a charge pump voltage at the control terminal of the replica transistor equal to a sum of the second voltage and the first voltage.

5. The switching regulator circuit of claim 1, wherein the control circuit further comprises a comparator having a first input coupled to a first terminal of the capacitor and a second input coupled to a terminal of the replica transistor.

6. The switching regulator circuit of claim 1, wherein the control circuit further comprises a transconductance circuit to produce the control current.

7. The switching regulator circuit of claim 6, wherein the transconductance circuit comprises a first input coupled to a reference voltage and a second input coupled to receive a feedback voltage, wherein the control current is based on a difference between the reference voltage and the feedback voltage.

8. The switching regulator circuit of claim 7, wherein the feedback voltage is an output voltage of the switching regulator.

9. The switching regulator circuit of claim 6, wherein the control circuit further comprises:
   a second replica transistor; and
   a third replica transistor,
   wherein the transconductance circuit generates a first current corresponding to a maximum output current through the second replica transistor to produce a first limit voltage,
   wherein the transconductance circuit generates a second current corresponding to a minimum output current through the third replica transistor to produce a second limit voltage, and
   wherein the first limit voltage and the second limit voltage limit the output current to be within a particular range.

10. The switching regulator circuit of claim 1, wherein the boosted voltage is less than a positive supply voltage for a maximum negative inductor current and greater than ground for a maximum positive inductor current.

11. The switching regulator circuit of claim 1, further comprising an inductor having a first terminal coupled a terminal of the low side switching transistor and a second terminal coupled to an output node of the switching regulator circuit.

12. The switching regulator circuit of claim 11, further comprising a high side switching transistor having a first terminal coupled to a supply voltage and a second terminal the first terminal of the inductor.

13. A method comprising:
   sensing a voltage on a switching transistor of a switching regulator produced by an output current through the switching transistor when the switching transistor is on, the voltage being outside an operating voltage range of the switching regulator;
   level shifting the sensed voltage by a first voltage stored on a capacitor to produce a level shifted voltage within the voltage range at a first input of a comparator;
   generating a control voltage at a second input of the comparator, the control voltage generated by coupling a control current into a first terminal of a replica transistor corresponding to the switching transistor;
   during a first phase, when the low side switching transistor is off, coupling the first voltage to a first terminal of the capacitor through a first switch and coupling a low reference voltage to a second terminal of the capacitor through a second switch; and
   during a second phase, when the low side switching transistor is on, opening the first switch and the second switch and coupling the voltage on the low side switching transistor to the second terminal of the capacitor through a third switch.

14. The method of claim 13, further comprising determining the control current using an analog-to-digital converter.

15. The method of claim 13, further comprising converting a difference between a reference voltage and the output voltage of a switching regulator stage into the control current.

16. The method of claim 13, further comprising:
   coupling a charge pump voltage equal to a sum of a second voltage and the first voltage to a control terminal of the replica transistor and coupling the first voltage to a second terminal of the replica transistor, wherein the first terminal of the replica transistor is coupled to the second input of a comparator; and
   coupling the second voltage to a control terminal of the low side switching transistor during the second phase, coupling a first terminal of the low side switching transistor to ground, and coupling a second terminal of the low side switching transistor to the first input of the comparator through the capacitor.

* * * * *